(12) United States Patent
Tasserit et al.

(10) Patent No.: US 10,041,233 B2
(45) Date of Patent: Aug. 7, 2018

(54) FAUCET VALVE HOUSING ASSEMBLY

(71) Applicant: Kohler Co., Kohler, WI (US)

(72) Inventors: Anaël Tasserit, Trigny (FR); Rémy Lamoureux, Reims (FR); Thomas Doussinaud, Reims (FR); Mickael Nollet, Saint Hilaire le Grand (FR)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/181,983

(22) Filed: Jun. 14, 2016

(65) Prior Publication Data

US 2016/0376775 A1     Dec. 29, 2016

Related U.S. Application Data

(60) Provisional application No. 62/183,600, filed on Jun. 23, 2015.

(51) Int. Cl.
| | | |
|---|---|---|
| *E03C 1/04* | (2006.01) | |
| *F16K 11/00* | (2006.01) | |
| *F16K 27/04* | (2006.01) | |
| *F16K 27/00* | (2006.01) | |

(52) U.S. Cl.
CPC .......... *E03C 1/0404* (2013.01); *E03C 1/0403* (2013.01); *F16K 19/006* (2013.01); *F16K 27/00* (2013.01); *F16K 27/044* (2013.01); *Y10T 137/5109* (2015.04); *Y10T 137/5196* (2015.04); *Y10T 137/7504* (2015.04)

(58) Field of Classification Search
CPC ......... Y10T 137/5109; Y10T 137/5196; Y10T 137/7504; E03C 1/0403; E03C 1/0404
See application file for complete search history.

(56) References Cited

U.S. PATENT DOCUMENTS

| | | | | |
|---|---|---|---|---|
| 3,245,430 A | * | 4/1966 | Enterante | F16K 11/202 137/454.2 |
| 5,515,882 A | * | 5/1996 | Hennis | E03C 1/0401 137/315.12 |
| 6,435,212 B2 | * | 8/2002 | Brandebusemeyer | E03C 1/0404 137/615 |
| 8,925,572 B2 | * | 1/2015 | Shih | E03C 1/0404 137/315.12 |

(Continued)

FOREIGN PATENT DOCUMENTS

| | | |
|---|---|---|
| DE | 8327503 | 12/1983 |
| EP | 2586919 | 5/2013 |
| WO | WO02/23072 | 3/2002 |

OTHER PUBLICATIONS

European Search Report dated Nov. 18, 2016 in EP Application No. 16175148.2 (6 pages).

*Primary Examiner* — Kevin Murphy
(74) *Attorney, Agent, or Firm* — Foley & Lardner LLP (57) ABSTRACT

A valve housing assembly includes a valve housing and a hollow cover. The valve housing includes an upper portion configured to couple to a valve cartridge and a lower portion configured to couple to one or more water supply lines. The hollow cover is configured to be coupled to the valve housing in a plurality of different orientations, and substantially surrounds, and sealingly engages, the valve housing. The valve housing assembly is configured to be coupled to, and received within, a plurality of faucets having different configurations.

20 Claims, 10 Drawing Sheets

(56) References Cited

U.S. PATENT DOCUMENTS

| | | | |
|---|---|---|---|
| 2006/0162795 A1* | 7/2006 | Gloor .................... | E03C 1/0404 |
| | | | 137/801 |
| 2007/0251590 A1* | 11/2007 | Weinstein ............. | E03C 1/0404 |
| | | | 137/801 |
| 2015/0159768 A1* | 6/2015 | Yang ..................... | F16K 27/065 |
| | | | 137/599.01 |

* cited by examiner

FAUCET VALVE HOUSING ASSEMBLY

CROSS-REFERENCE TO RELATED PATENT APPLICATIONS

This application claims the benefit of and priority to U.S. Provisional Application No. 62/183,600 filed Jun. 23, 2015, the entire disclosure of which is incorporated by reference herein.

BACKGROUND

The present application relates generally to the field of valve housing assemblies for a faucet (e.g., kitchen faucets, bathroom faucets, etc.), and in particular, a valve housing assembly that may be used in several types of different faucets.

Valve housing assemblies for faucets are typically designed to be installed one way. For example, the various parts (e.g., elements) of a valve housing assembly may be coupled together in one specific configuration. Thus, a valve housing assembly may be designed to fit within (e.g., be packaged within) a specific configuration for a faucet. Accordingly, when new faucets are designed having different sizes, shapes, and aesthetic features, each new faucet generally requires a new valve housing assembly.

Thus, it would be advantageous to provide a valve housing assembly that is configured to fit within several different faucet configurations. These and other advantageous features will become apparent to those reviewing the present disclosure and claims.

SUMMARY

According to an exemplary embodiment, a valve housing assembly includes a valve housing and a hollow cover. The valve housing includes an upper portion configured to couple to a valve cartridge and a lower portion configured to couple to one or more water supply lines. The hollow cover is configured to be coupled to the valve housing in a plurality of different orientations, and substantially surrounds, and sealingly engages, the valve housing. The valve housing assembly is configured to be coupled to, and received within, a plurality of faucets having different configurations.

According to another exemplary embodiment, a valve housing assembly includes a valve housing, a cover, and an outlet conduit. The valve housing includes an upper portion configured to couple to a valve cartridge and a lower portion configured to couple to one or more water supply lines. The cover is configured to be coupled to, and substantially surround at least a portion of, the valve housing. The cover includes a first end, a second end located opposite the first end, and a hole disposed in a radial surface of the cover and positioned closer to the first end than the second end. The outlet conduit is removably coupled to the cover at the hole, and is configured to direct fluid from the valve housing to an outlet of a faucet spout. The cover is configured to be coupled to the valve housing in a plurality of different orientations such that the valve housing assembly may be coupled to, and received within, a plurality of faucets having different spout configurations.

According to another exemplary embodiment, a faucet includes a valve housing assembly having a valve housing and a cover. The valve housing includes an upper portion configured to couple to a valve cartridge and a lower portion configured to couple to one or more water supply lines. The cover is configured to be coupled to the valve housing in a plurality of different orientations such that the valve housing assembly may be coupled to, and received within, a plurality of faucets having different configurations. The cover substantially surrounds at least a portion of the valve housing.

DETAILED DESCRIPTION

Referring generally to the FIGURES, disclosed herein is an improved valve housing assembly that includes a valve housing, a valve housing cover, one or more seal members, a water supply retainer, and a spring, according to an exemplary embodiment. The valve housing assembly may be coupled to a faucet assembly (e.g., a faucet spout, spout body, etc.) having a variety of configurations (e.g., different height bases, different spout designs, etc.) in order to overcome the aforementioned problems associated with installation, design, and/or manufacturing of conventional valve housing and faucet assemblies. According to an exemplary embodiment, the valve housing assembly may be received within several variants of a spout body, wherein each variant may include a standard bore. In this manner, the disclosed valve housing assembly can be used across a plurality of different types of faucet assemblies having different configurations, which can, advantageously, reduce the costs associated with manufacturing multiple different types of valve housings to accommodate different faucet configurations.

Figure 1A:
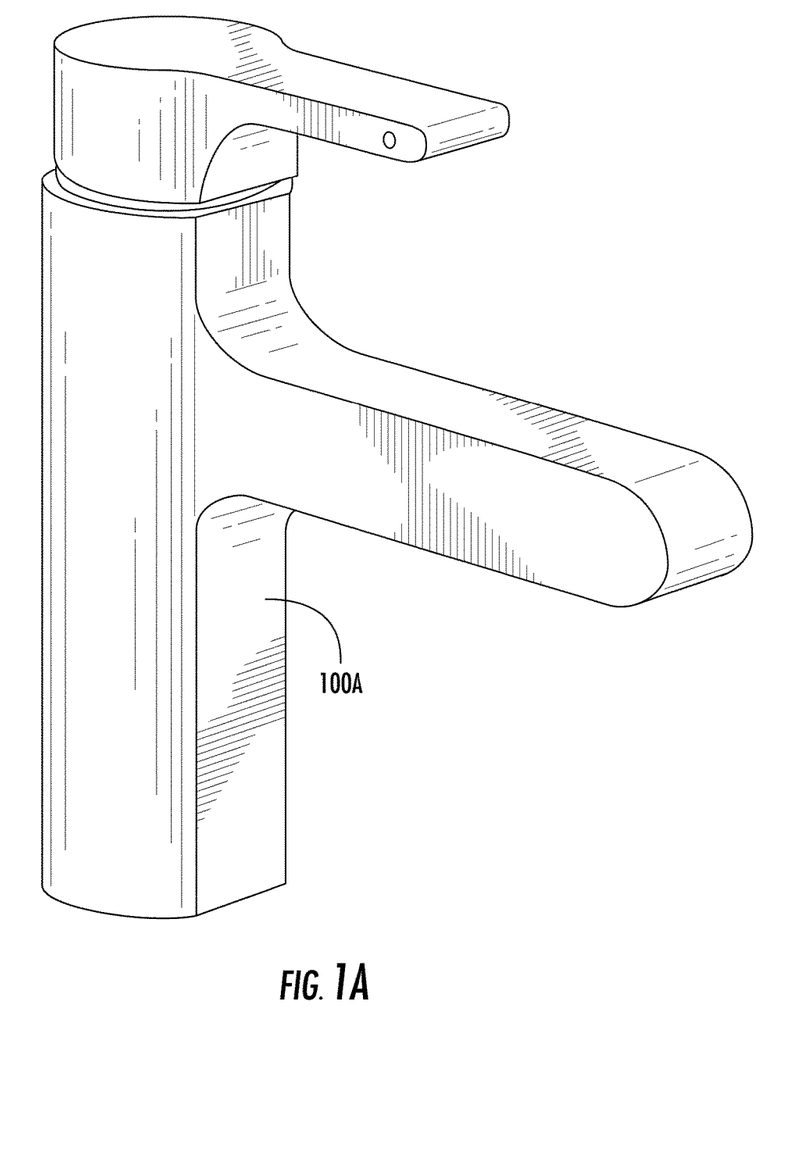
FIG. 1A is a perspective view of a faucet assembly, which may be used with an exemplary embodiment of a valve housing assembly disclosed herein.
Figure 1B:
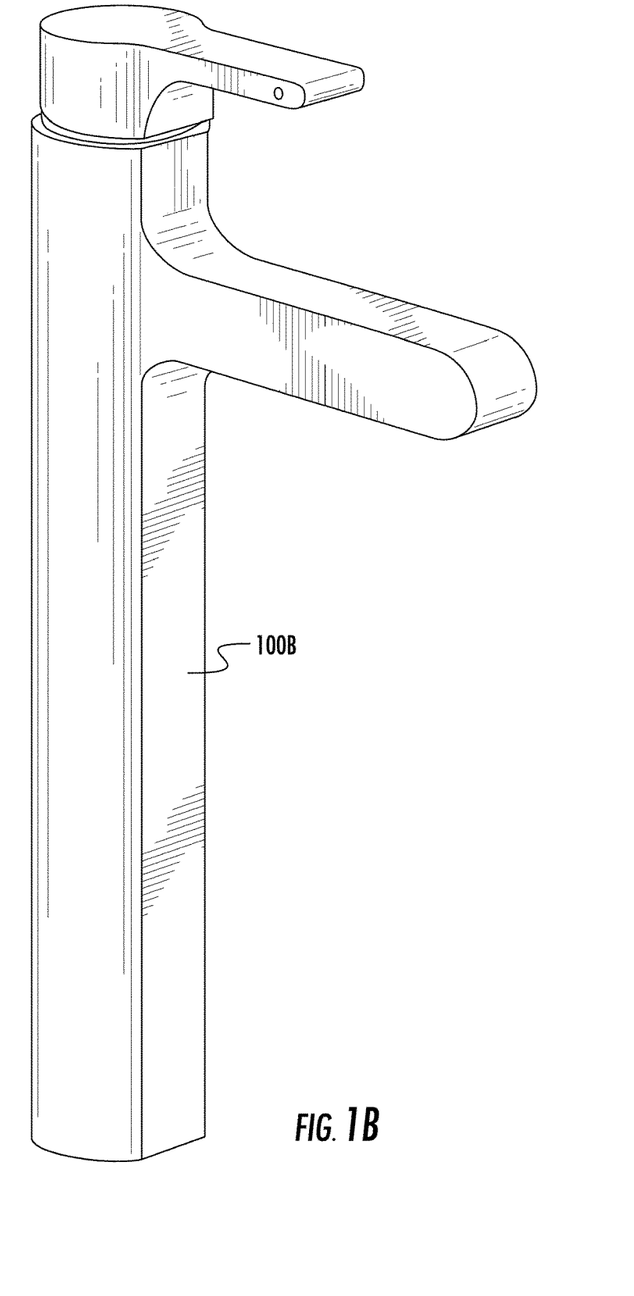
FIG. 1B is a perspective view of another faucet assembly, which may be used with an exemplary embodiment of a valve housing assembly disclosed herein.

FIGS. 1A-1B illustrate two different types of faucet spouts that may be used in conjunction with the valve housing assemblies disclosed herein. As shown, the exemplary embodiments for a valve housing assembly may accommodate faucet spouts with outlets that are provided at different heights. Further, the faucet spouts shown in FIGS. 1A-1B may include a base 100A, 100B including a standard bore (not shown), which may be appropriately sized and configured to receive the valve housing assembly 10 disclosed herein. Further, the valve housing assemblies 10 disclosed herein may be configured to be sealed within the faucet base, such as in the base 100A or the base 100B. For example, the valve housing assembly 10 includes a valve housing 12 shown in FIGS. 2-4 having a base 30A that includes a sealing portion 30B. The sealing portion 30B is configured to receive a seal 11 (e.g., an o-ring, sealing member, etc.). The seal 11 can, advantageously, sealingly engage a portion of the faucet base to form a watertight seal therebetween. In this way, the valve housing assembly 10 can prevent water from leaking below the valve housing 12 and below the faucet spout. The faucet spouts shown in FIGS. 1A-1B are disclosed by way of example, and the disclosed valve housing assembly 10 may be used in a variety of other faucet spout/base designs and configurations.

Figure 2:
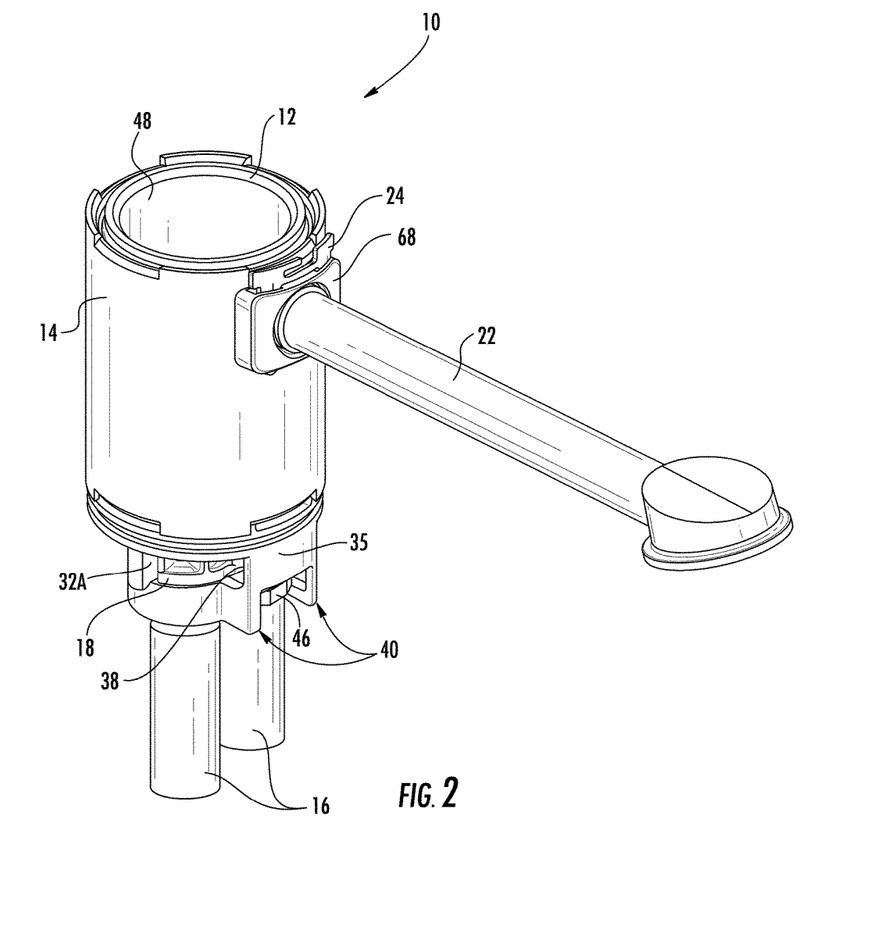
FIG. 2 is a perspective view of a valve housing assembly, according to an exemplary embodiment.
Figure 3:
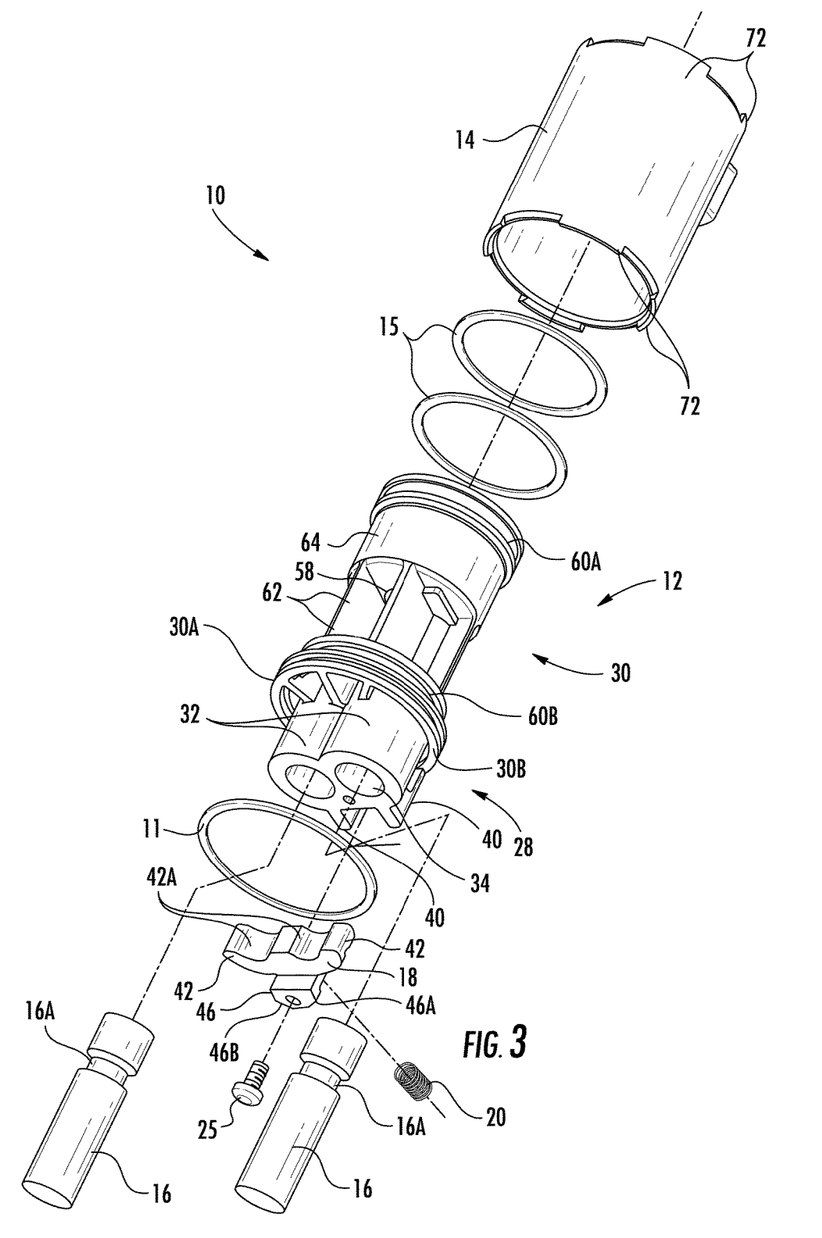
FIG. 3 is a bottom, rear perspective exploded view of the valve housing assembly shown in FIG. 2.
Figure 4:
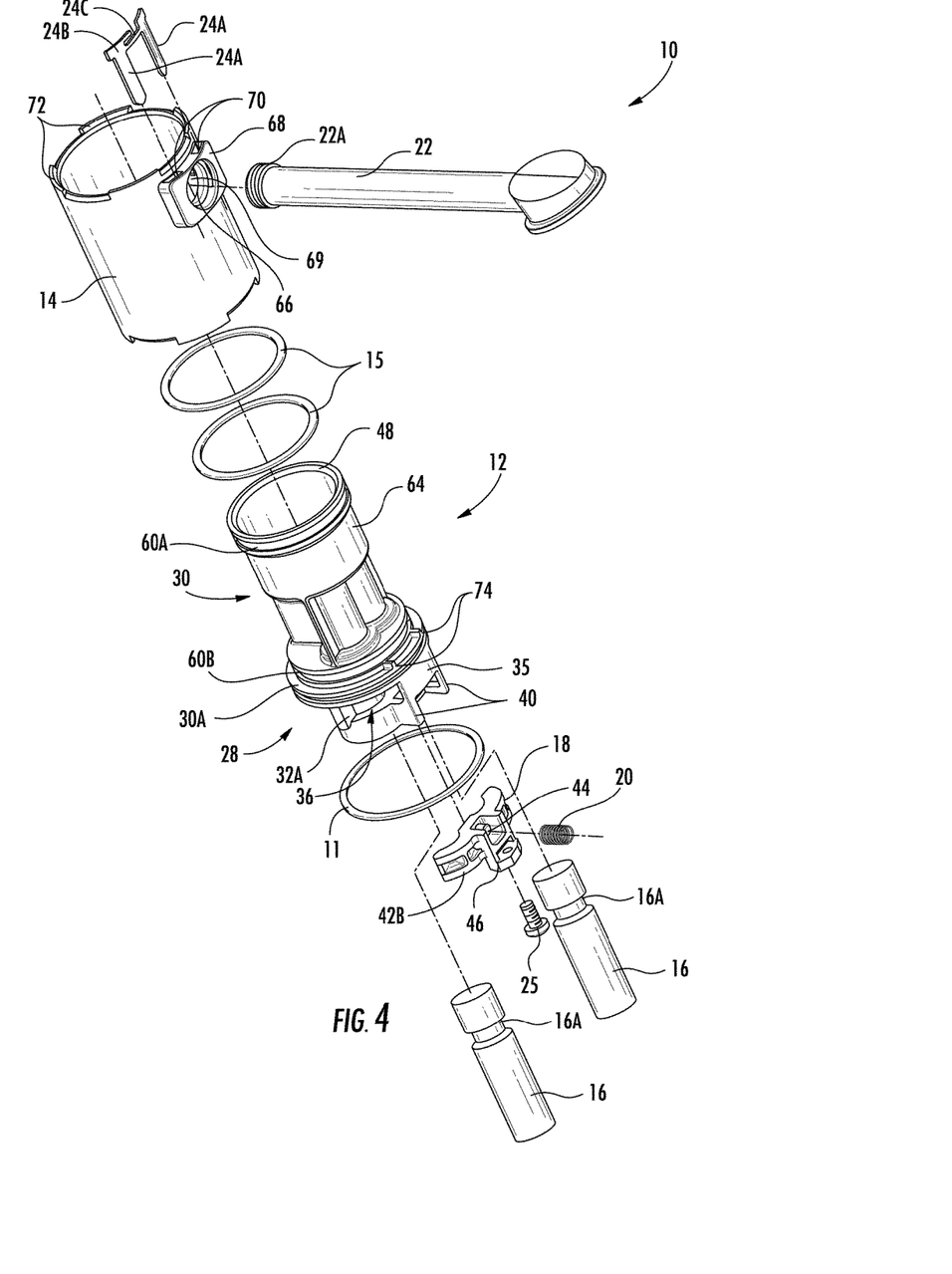
FIG. 4 is a top, front perspective exploded view of the valve housing assembly shown in FIG. 2.

Referring to FIGS. 2-4, according to an exemplary embodiment, the valve housing assembly 10 includes a valve housing 12 (e.g., a platform, receiver, body, hub, etc.). The valve housing 12 is configured to be coupled to, and within, a hollow, cylindrical cover 14 (e.g., a surround, tube, shell, cylinder, etc.). The hollow, cylindrical cover 14 is configured to substantially surround, and sealingly engage, at a least a portion of the valve housing 12. The valve housing 12 is also configured to removably couple one or more water supply lines 16 thereto (e.g., water supply tubes/conduits, fluid tubes/conduits, etc.). A water supply retainer 18 (e.g., a holder, locking member, etc.) and a biasing member 20 (e.g., a compression spring, resilient member, spring member, etc.) are used to removably couple the one or more water lines 16 to the valve housing 12. An outlet conduit 22 (e.g., an outlet tube, fluid tube, etc.) is removably coupled to the cover 14 via a retainer clip 24 (e.g., retainer, retainer pin, etc.). The outlet conduit 22 is received within a hole 66 disposed in a radial surface of the cover 14. A valve cartridge 26 (not shown in FIGS. 2-4, but see, e.g., FIG. 8) is coupled to the valve housing 12 at an upper portion thereof. As will be explained in greater detail below, according to an exemplary embodiment, the cover 14 may be coupled to the valve housing 12 in several different orientations to allow for the valve housing assembly 10 to be used across a plurality of different faucet configurations having different spout designs.

Referring to FIGS. 3-4, according to an exemplary embodiment, the valve housing 12 is generally cylindrical, and generally includes a lower portion 28 (e.g., bottom portion, etc.) and an upper portion 30 (e.g., top portion, etc.) provided above the lower portion 28. For example, the valve housing 12 includes a base 30A (e.g., wall, floor, etc.) that may define a lower end of the upper portion 30. The lower portion 28 is generally provided below a bottom surface of the base 30A. The lower portion 28 of the valve housing 12 is configured to be coupled to the one or more water lines 16. For example, the lower portion 28 of the valve housing 12 includes one or more ports 32 (e.g., two ports are shown on the lower portion 28, although more or fewer than two ports may be used) that extend downward from a bottom surface of the base 30A, and each port 32 includes an aperture 34 (e.g., a hole) disposed therein. According to an exemplary embodiment, each of the apertures 34 is appropriately sized to receive an end of a water line 16 therein. The ends of the one or more water lines 16 that are received by the ports 32 may include a circumferential groove 16A. The circumferential grooves 16A may be provided along the entire circumference of the one or more water lines 16. Alternatively, the circumferential grooves 16A may be provided on a portion of the one or more water lines 16.

Referring now to FIG. 4, a front perspective view of the valve housing 12 is shown. The valve housing 12 includes a slot 36 (e.g., a cutout, cavity, etc.) extending between the two apertures 34 and a front surface of the ports 32. The slot 36 is positioned proximate the bottom surface of the base 30A, and the slot 36 extends through a front section of both ports 32, so that each aperture 34 is openly disposed to an area in front of the ports 32. The slot 36 is bounded on an inner side by an outer wall portion 32A of each port 32.

Referring to FIGS. 3-4, according to an exemplary embodiment, a water supply retainer 18 includes a body having two curved arms 42. The two curved arms 42 are horizontally, linearly aligned in a side-by-side fashion. As shown, the arms 42 are generally symmetric relative to a vertical plane (not shown) through the center of the water supply retainer 18. Additionally, each arm 42 is shown to have a concave surface 42A. According to an exemplary embodiment, the concave surface 42A of each arm 42 may generally correspond (i.e., complementary) to an outer radial surface of the circumferential grooves 16A of the one or more water lines 16. Further, according to an exemplary embodiment, the width of each arm 42 may generally correspond to a diameter of a port 32. Accordingly, the width of both arms 42 generally corresponds to the combined width of both ports 32. According to an exemplary embodiment, a height of the arms 42 is less than a height of the slot 36. Further, according to an exemplary embodiment, the height of the arms 42 is less than a height of the circumferential grooves 16A of the one or more water lines 16. The arms 42 of the water supply retainer 18 are configured to be received by the slot 36 and the circumferential grooves 16A. When the arms 42 are received by the slot 36, an outermost portion of each arm 42 may engage (e.g., abut against) the outer wall portion 32A of a respective port 32.

According to an exemplary embodiment, when the arms 42 of the water supply retainer 18 are received within the slot 36, the front surface 42B of each arm 42 may engage or contact the outer wall portion 32A of each respective port 32. Each arm 42 is configured such that when the respective front surface 42B engages an outer wall portion 32A of a respective port 32, the concave surface 42A of each arm 42 extends within at least a portion of each aperture 34. Thus, when the one or more water lines 16 are received within the ports 32, the arms 42 may be received within the slot 36 and the concave surface 42A of each arm 42 may be received within the circumferential groove 16A of the one or more water tubes 16. Therefore, the water supply retainer 18 may be configured to hold or retain the one or more water lines 16 within the valve housing 12.

Figure 6A:
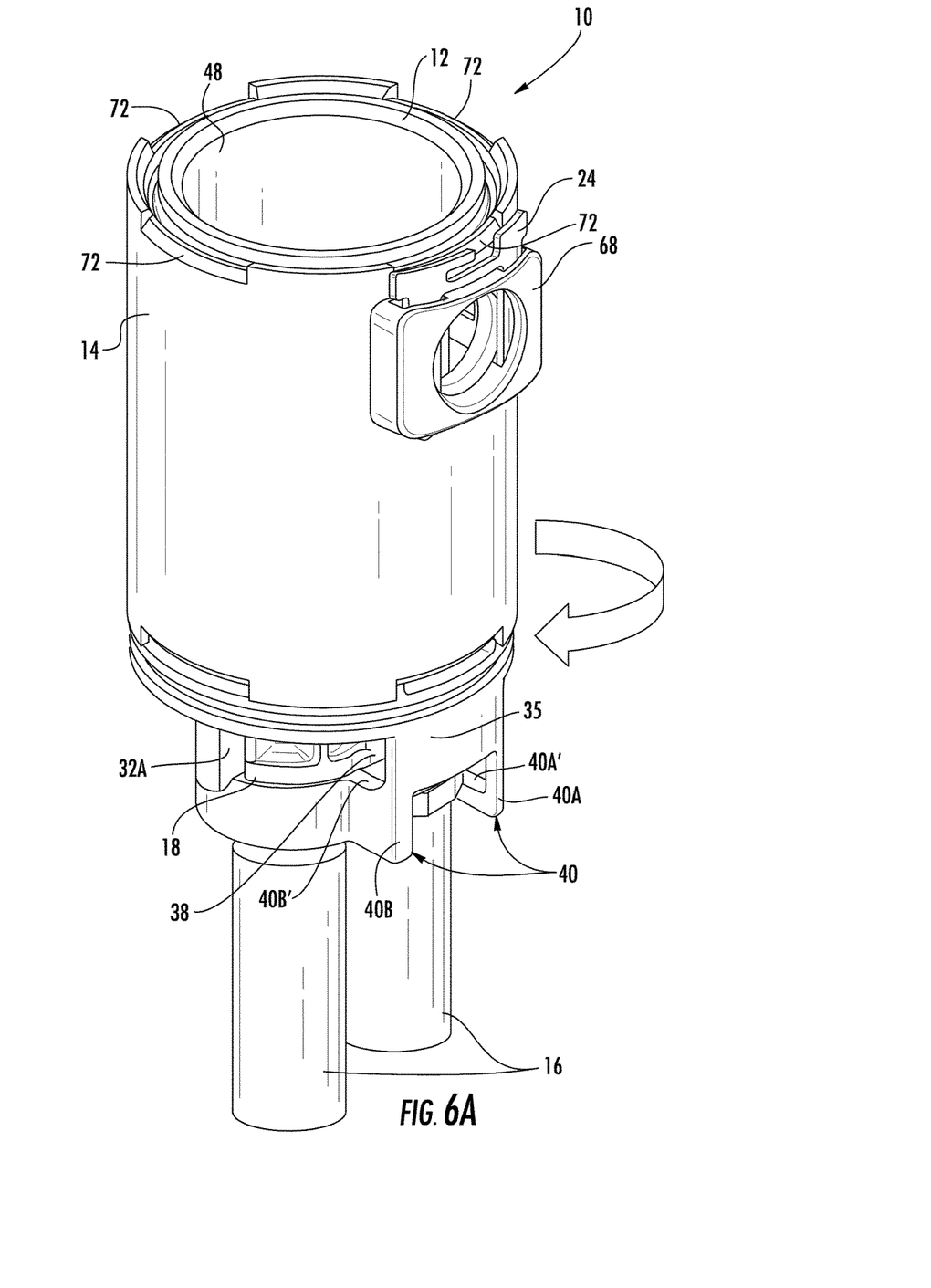
FIG. 6A is a perspective view of the valve housing assembly shown in FIG. 2, according to an exemplary embodiment.
Figure 6B:
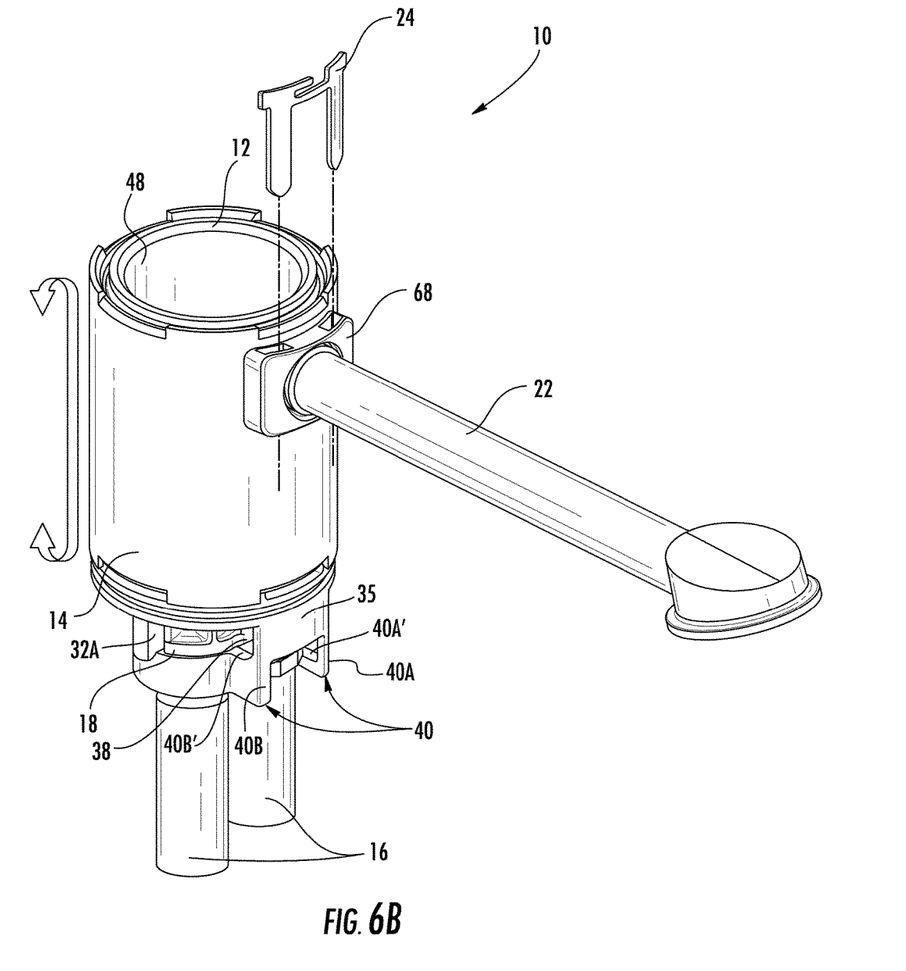
FIG. 6B is another perspective view of the valve housing assembly shown in FIG. 2, according to an exemplary embodiment.

As shown in FIGS. 2 and 4, a wall 35 extends downward from a front end of the lower portion 28 of the valve housing 12, forward of the ports 32. According to an exemplary embodiment, the wall 35 is integrally formed with the lower portion 28 of the valve housing 12. Further, a bottom of the wall 35 may be coupled to each port 32 via one or more flanges 40 (e.g., arms, members, etc.). As shown in FIG. 6, the valve housing includes a pair of flanges 40 shown as a first flange 40A and a second flange 40B. As shown, the first flange 40A is substantially shorter than the second flange 40B. In particular, a bottom surface of each of the two flanges may be generally coplanar, but a top surface 40A' of the first flange 40A located opposite the bottom surface is provided below a top surface 40B' of the second flange 40B.

The wall 35 and the ports 32 are shown to be separated by a space 38 (e.g., a clearance) therebetween. Therefore, the space 38 may be bounded on an inner side by the outer wall portions 32A, on a forward side by the wall 35, and on a bottom side by the flanges 40. According to an exemplary embodiment, the water supply retainer 18 is configured to be received within the space 38. For example, a depth of the water supply retainer 18, as measured between the front surface 42B of the arms 42 and a rear side of the water supply retainer 18 is less than the distance between the outer wall portions 32A and the wall 35. Also, a height of the water supply retainer 18 is less than the distance between the bottom surface of the base 30A and the top surface of the flange 40A, according to an exemplary embodiment. Further, the second flange 40B and the wall 35 can constrain the water supply retainer 18 to prevent it from falling out, or becoming dislodged, from within the space 38 of the valve housing 12.

According to an exemplary embodiment shown in FIGS. 3-4, a rear side of the water supply retainer 18 (opposite the concave surfaces 42A) further includes a barrel 44 (e.g., a protrusion, projection, etc.), and a bottom side of the water supply retainer 18 includes a tab 46. The barrel 44 and the tab 46 are each centered horizontally between the arms 42. Further, the barrel 44 and the tab 46 are generally vertically aligned with each other, the barrel 44 being provided above the tab 46. The barrel 44 is shown as extending rearwardly outward from the water supply retainer 18. The tab 46 is shown to include a flange 46A which extends rearwardly outward away from the water supply retainer 18.

Referring to FIG. 3, according to an exemplary embodiment, the flange 46A of the tab 46 includes a hole 46B. The hole 46B may be threaded, or include a smooth bore. The hole 46B is configured to receive a fastener 25 (e.g., a screw, bolt, etc.), which may be used to prevent the water supply retainer 18 from being forced rearwardly toward the wall 35. Accordingly, the fastener 25 may prevent uninstallation or decoupling of the one or more water lines 16 from the valve housing 12 (to be explained in greater detail below). In some countries, applicable regulations (e.g., building codes, etc.) may require greater security of water lines to a valve housing, and the fastener 25 is intended to satisfy such regulations. In other countries, the fastener 25 may not be required in the valve housing assembly 10 in order to satisfy applicable regulations.

As shown in FIGS. 3-4, the biasing member 20 may be placed over (e.g., around) the barrel 44. Further, the biasing member 20 and the barrel 44 may be cooperatively configured such that when the biasing member 20 is coupled to the barrel 44, and the water supply retainer 18 is received within the space 38, the biasing member 20 engages the wall 35 and biases the water supply retainer 18 inwardly toward the valve housing 12 so that the arms 42 engage the outer wall portions 32A of the ports 32. Thus, when the water supply retainer 18 and the biasing member 20 are coupled to the valve housing 12, the concave surface 42A of each arm 42 is normally forced in position within a respective aperture 34. In other words, the biasing member 20 can bias the retainer 18 against the one or more water supply lines 16 within each port so as to retain the one or more water supply lines 16 in the valve housing 12.

Referring to FIG. 2, according to an exemplary embodiment, when the water supply retainer 18 is properly positioned within the space 38, the tab 46 extends below, or underneath the wall 35, and is centered horizontally between the two flanges 40. Thus, a user (e.g., an installer) may access and pull the tab 46 in order to provide an opposing force (i.e., a compressive force) to the biasing member 20. Accordingly, when a user pulls the tab 46, the biasing member 20 is compressed and the water supply retainer 18 may be moved toward the wall 35. As the water supply retainer 18 moves toward the wall 35, the arms 42 may move completely out of the apertures 34. When the user releases the tab 46, the water supply retainer 18 may be biased against the outer wall portions 32A of the ports 32.

Although a water supply retainer 18 having two arms 42 is disclosed herein, according to another exemplary embodiment, a water supply retainer may be configured with a single arm (not shown). The single arm may be centered horizontally on the water supply retainer, and the height of the single arm may be less than the height of the slot 36 and the circumferential grooves 16A of the water lines 16. For a valve housing that includes two ports 32, the length of the single arm may be configured to correspond to the width of both ports 32. For a valve housing that includes a single port, the length of the single arm may be configured to correspond to the width of the single port. According to this embodiment, when the single arm engages the outer wall portions 32A of the port(s) 32, a portion of the single arm is disposed within the aperture(s) 34.

According to an exemplary embodiment, each arm 42 of the water supply retainer 18 may have any suitable shape. For example, the combined arms 42 may be shaped like an "E," such that the "legs" of the "E" are configured to engage the circumferential grooves 16A of the one or more water lines 16 to couple the water lines to the valve housing 12.

According to an exemplary embodiment, the one or more water lines 16 are configured to force the water supply retainer 18 rearward outwardly, such that the arms 42 move out of the apertures 34. For example, an end of each of the one or more water lines 16 may be chamfered (e.g., beveled, tapered, etc.). Thus, as a water line 16 is inserted into a port 32, the chamfered edge of the water line 16 may engage a bottom edge of an arm 42. As the water line 16 engages an arm 42, the water supply retainer 18 is forced to move outwardly toward the wall 35 of the lower portion 28. As the water line 16 continues to be forced into the port 32, the circumferential groove 16A will become aligned with the arm 42 of the water supply retainer, and the biasing member 20 will force the water supply retainer 18 inwards so that the arm(s) engage the circumferential groove(s) 16A, thereby coupling the one or more water lines 16 to the valve housing 12.

Accordingly, a method of installing one or more water lines 16 to the valve housing 12 may include one, easy step: insert the chamfered ends of the one or more water lines 16 into a respective port 32, and push upwards to force the water supply retainer 18 outward until the circumferential grooves 16A are aligned with the arms 42. Thus, as the one or more water lines 16 are pushed (e.g., forced, inserted, etc.) into a respective port 32, the one or more water lines 16 become locked (e.g., secured, etc.) to the valve housing 12. Advantageously, the one or more water lines 16 may be easily coupled to the valve housing without the use of tools, and without the need for complicated, tedious movements (e.g., tightening a threaded line, for example). A method of uninstalling the one or more water lines 16 from the valve housing 12 may include one, or two easy steps. First, a user may pull the tab 46 of the water supply retainer 18 backwards toward the wall 35. If necessary, the user may also pull down on the one or more water lines 16.

Figure 5:
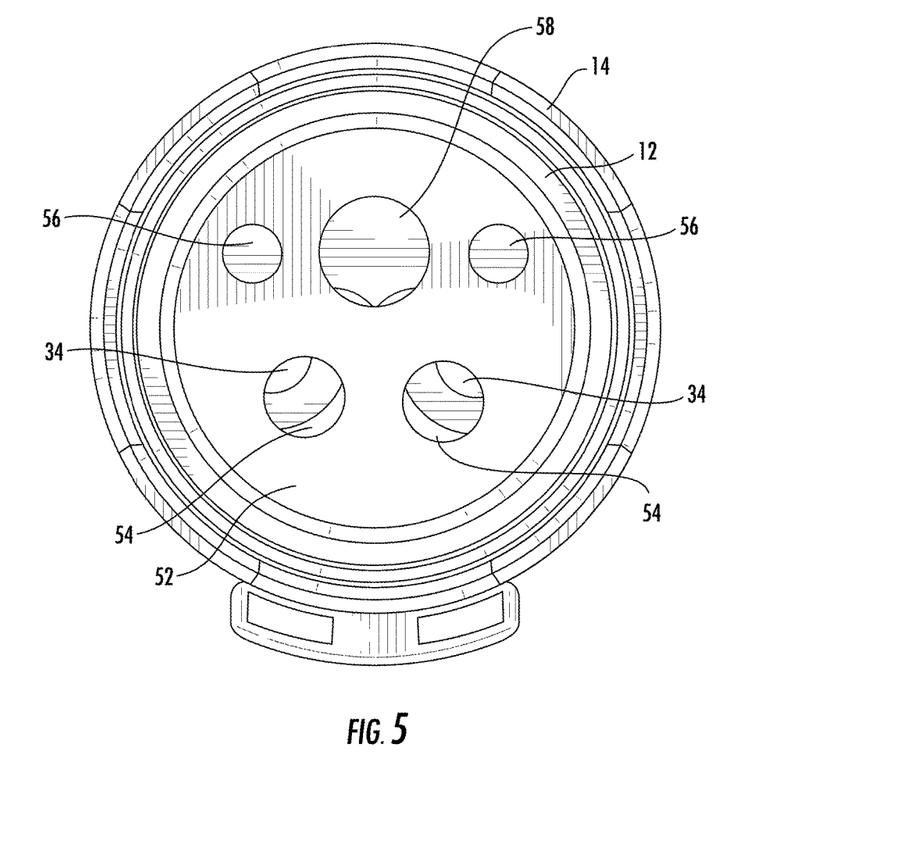
FIG. 5 is a top plan view of the valve housing assembly shown in FIG. 2 (an outlet conduit is not illustrated).
Figure 8:
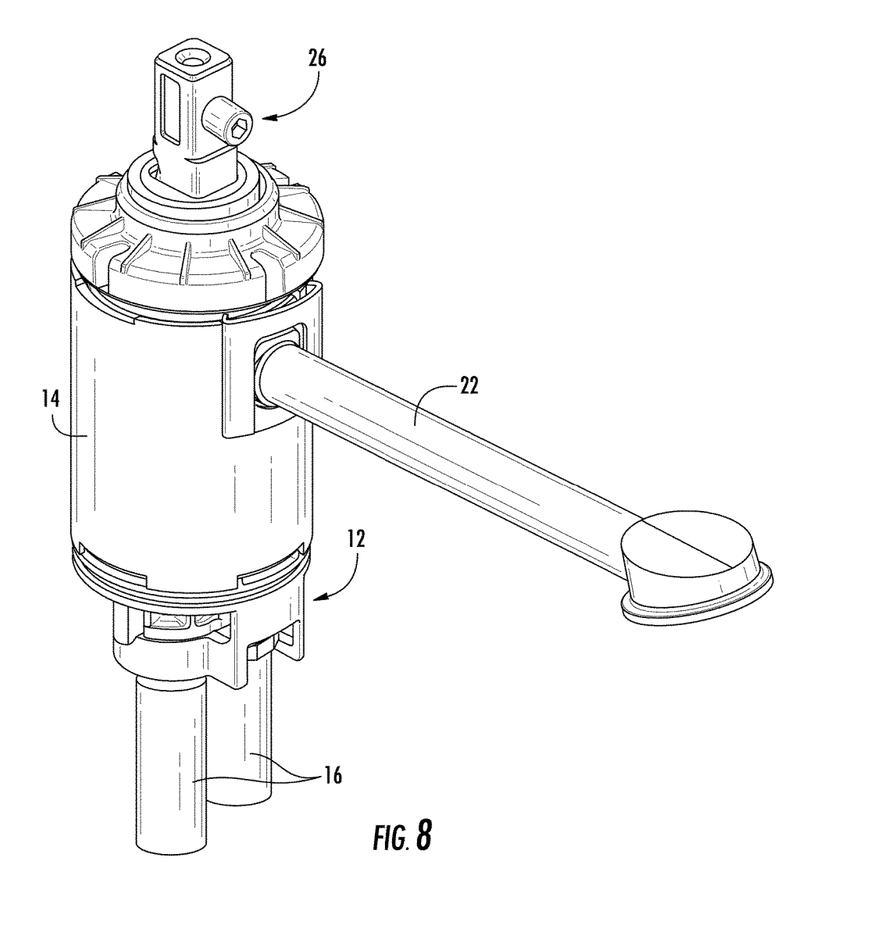
FIG. 8 is a perspective view of a valve housing assembly, according to another exemplary embodiment.

Referring now to FIGS. 2 and 5, according to an exemplary embodiment, the upper portion 30 of the valve housing 12 is configured to be coupled to the valve cartridge 26 (see, for example, FIG. 8). For example, an upper surface of the upper portion 30 includes a bore 48 having an inner diameter, and the valve cartridge 26 includes a base having an outer diameter, which is less than the inner diameter of the bore 48. The bore 48 includes a bottom wall 52 having a plurality of holes disposed therein. For example, the bottom wall 52 includes an inlet hole 54 for each port 32 provided on the lower portion of the 28 of the valve housing 12.

Further, each inlet hole 54 is in fluid communication with a respective aperture 34. The inlet holes 54 depicted in FIG. 5 are not concentrically aligned with the apertures 34. Although, according to other exemplary embodiments, the inlet holes 54 may be concentrically aligned with the apertures 34, and the inlet holes 54 may have any suitable size. The bottom wall 52 may also include one or more positioning holes 56 used to align (e.g., orient) the valve cartridge 26 relative to the valve housing 12. For example, the base of the valve cartridge 26 may include one or more lugs (not shown, but e.g., barrels, protrusions, members, etc.) that correspond to the one or more positioning holes 56.

According to an exemplary embodiment, the bottom wall 52 also includes an outlet hole 58. As shown in FIG. 5, the inlet holes 54 are horizontally aligned, and disposed forward of the outlet hole 58. The outlet hole 58 is disposed rearward of the inlet holes 54, and is centered horizontally relative to the inlet holes 54. The positioning holes 56 are shown as being generally horizontally aligned with the outlet hole 58, and one positioning hole 56 is provided on either the left and right side of the outlet hole 58. Although the various holes within the bottom wall 52 are disclosed herein as having a particular arrangement, the holes may be arranged in any suitable way within the bottom wall 52.

According to an exemplary embodiment, a seal (not shown, but e.g., an o-ring, seal member, etc.) may be provided between an outer radial surface of the valve cartridge 26 and the bore 48 of the valve housing 12. Thus, the valve housing assembly 10 may be configured to be fluidly sealed between valve housing 12 and the valve cartridge 26.

According to an exemplary embodiment, the valve cartridge 26 may be coupled to the valve housing 12 in any suitable way. For example, the valve cartridge 26 may include male threads, and the valve housing 12 may include female threads. Alternatively, the valve cartridge 26 may be configured to be press-fit (e.g., interference fit) into the valve housing 12. The valve cartridge 26 and the valve housing 12 may also be configured to have a snap-fit connection, a bayonet mounting connection, or a latch mechanism that couples the valve cartridge 26 to the valve housing 12.

According to an exemplary embodiment, the valve cartridge 26 may control the relative amounts of water able to flow between the one or more water lines 16 and the valve housing 12. For example, although not shown in the FIGURES, the valve cartridge 26 may include a mixing valve (not shown) that may include a fixed ceramic disk (not shown) and a rotatable ceramic disk (not shown). Further, a faucet handle (not shown) may be coupled to the rotatable ceramic disk, and movement of the faucet handle controls the orientation of the rotatable ceramic disk relative to the fixed ceramic disk, thus controlling the amount of water able to flow between the one or more water lines 16, the mixing valve, and the valve housing 12. The ceramic disks may be configured such that a degree of movement of the rotatable ceramic disk may place either, or both inlet holes 54 in open fluid communication with a respective aperture 34. The mixing valve may include a chamber in which water from both water lines 16 may be mixed (when the rotatable ceramic disk is oriented to place both inlet holes 54 in open fluid communication with a respective water lines 16). When the rotatable ceramic disk allows water from a water lines 16 to flow through a respective inlet hole 54, the water becomes in open fluid communication with the outlet hole 58.

Referring now to FIGS. 3-4, the upper portion 30 includes a pair of generally cylindrical sealing sections 60A, 60B. The first sealing section 60A is provided proximate an opening of the bore 48 (proximate an uppermost portion of the upper portion 30), and the second sealing section 60B is provided above the base 30A including the sealing portion 30B. Each of the sealing sections 60A, 60B includes a circumferential groove configured to receive a sealing member (not shown, but e.g., an o-ring, a sealing member, etc.). According to an exemplary embodiment, the sealing sections 60A, 60B generally have the same circumference. According to another exemplary embodiment, the sealing sections 60A, 60B have different circumferences. Further, according to an exemplary embodiment, the sealing sections 60A, 60B are narrower than the base 30A. In other words, the circumferences of the sealing sections 60A, 60B are less than the circumference of the base 30A.

Referring to FIG. 3, a pair of walls 62 are provided between the base 30A and the bore 48. The walls 62 are oriented substantially upright and are configured to provide structural support to the valve housing 12. In particular, the walls 62 generally support the bore 48, and increase the overall rigidity of the valve housing 12. Further, the outlet hole 58 within the bottom surface of the bore 48 is shown as being positioned between the walls 62. According to another exemplary embodiment, the walls 62 could have any suitable width, and could be oriented at any suitable angle relative to the valve housing base 30A. Further, it should be understood that a greater or fewer number of walls could be used to support the bore 48, or to provide rigidity to the valve housing 12.

Referring to FIGS. 2-4 and FIGS. 6A-6B, according to an exemplary embodiment, the cover 14 is generally hollow, and is configured to be coupled to the upper portion 30 of the valve housing 12. For example, the hollow portion of the cover 14 is received by the upper portion 30. According to an exemplary embodiment, the cover 14 is configured to seal against the sealing sections 60A, 60B when the cover 14 is coupled to the upper portion 30 of the valve housing 12. In other words, the cover 14 and the valve housing 12 are cooperatively configured such that a watertight seal is formed therebetween when the cover 14 is coupled to the valve housing 12.

Although the upper portion 30 is disclosed as including sealing sections 60A, 60B, and the cover 14 is shown as including a generally smooth inner surface, the cover 14 may alternatively include one or more sealing sections, and the upper portion 30 may be provided with or without the sealing sections 60A, 60B, according to another exemplary embodiment. According to another exemplary embodiment, the upper portion 30 and the cover 14 both include one or more sealing sections. According to another exemplary embodiment, the cover 14 is formed from rubber, or includes a rubberized interior coating, in order to provide a watertight seal against the upper portion 30.

According to an exemplary embodiment, the walls 62 of the upper portion 30 of the valve housing 12 are configured to be spaced apart from the inner surface of the cover 14 when the cover 14 is coupled to the valve housing 12. In other words, the walls 62 are provided interior relative to the sealing sections 60A, 60B, and a space (e.g., a clearance) is defined between the walls 62 and the inner surface of the cover 14 when the cover 14 is coupled to the valve housing 12. The space or clearance extends between the sealing sections 60A, 60B, and can, advantageously, allow fluid to flow from the valve housing 12 to the hole in the cover 14. Thus, the valve housing 12 and the cover 14 are cooperatively configured to allow water to flow through the outlet hole 58 past (e.g., around) the walls 62 when the cover 14 is coupled to the valve housing 12.

According to an exemplary embodiment shown in FIG. 3, the bore 48 of the valve housing 12 is generally defined by a cylindrical wall 64. The cylindrical wall 64 of the valve housing 12 is provided vertically between the sealing sections 60A, 60B. Further, according to an exemplary embodiment, an outer radial surface of the cylindrical wall 64 has a smaller circumference than the sealing sections 60A, 60B. Thus, the valve housing 12 is configured to allow water flowing through the outlet hole 58 to flow past (e.g., around) the cylindrical wall 64 when the cover 14 is coupled to the upper portion 30.

Referring to FIG. 4, according to an exemplary embodiment, a hole 66 is disposed through a radial surface of the cover 14. The hole 66 is provided proximate one of the ends of the cover 14 (i.e., the hole 66 is not vertically centered on the cover 14). According to an exemplary embodiment, a clip receiving structure 68 is coupled to an outer radial surface of the cover 14, and surrounds the hole 66. For example, the clip receiving structure 68 includes a central hole 69 (e.g., a hole, an aperture, an opening, etc.) that is concentric with the hole 66 when the clip receiving structure 68 is coupled to the cover 14. According to an exemplary embodiment, a diameter of the central hole 69 is larger than a diameter of the hole 66. Thus, when the clip receiving structure 68 is coupled to the cover 14, the hole 66 is openly disposed between the hollow interior of the cover 14, and the central hole 69 of the clip receiving structure 68. Further, when the clip receiving structure 68 is coupled to the cover 14, a portion of the cover 14 is exposed between the central hole 69 and the hole 66. The clip receiving structure 68 may be configured to generally conform to the curvature of the outer surface of the cover 14.

According to an exemplary embodiment, a top surface of the clip receiving structure 68 (e.g., proximate an end of the cover 14) may include a pair of holes 70 (e.g., pin holes, ports, etc.) disposed therein, and the holes 70 have an axis that generally runs parallel to a lengthwise portion, or height of the cover 14. The holes 70 may further extend from the top surface of the clip receiving structure 68 to a bottom surface of the clip receiving structure. Accordingly, the retainer clip 24 may be received by the holes 70 from the top or bottom surface of the clip receiving structure 68. According to an exemplary embodiment, the holes 70 extend downward from the top surface of the clip receiving structure 68, and are configured to intersect with left and right sections of the central hole 69. In other words, the holes 70 are positioned sufficiently inwards of the clip receiving structure 68 so that a portion of the holes 70 extend through outer sections of the central hole 69.

According to an exemplary embodiment, the retainer clip 24 includes a pair of legs 24A that are connected by a waist 24B. According to an exemplary embodiment, the legs 24A of the retainer clip 24 are configured to be received by the holes 70 of the clip receiving structure 68. According to an exemplary embodiment, when the retainer clip 24 is received by the holes 70, at least a portion of the legs 24A intersects the central hole 69. In other words, when the retainer clip 24 is coupled to the clip receiving structure 68, a portion of the legs 24A extends into a portion of the central hole 69. An upper middle portion of the waist 24B may include a notch 24C (e.g., a groove, etc.). A user may use a tool (e.g., a flat-head screwdriver) to engage the notch 24C and remove the retainer clip 24 from the clip receiving structure 68 by pulling in a generally upward direction.

According to an exemplary embodiment, the outlet conduit 22 is coupled to the cover 14 and the clip receiving structure 68 by the retainer clip 24. For example, according to an exemplary embodiment, an outer diameter of the outlet conduit 22 may be less than the inner diameter of the central hole 69, and greater than the inner diameter of the hole 66. Therefore, the outlet conduit 22 may be configured to engage the radial surface of the cover 14 (insertion of the outlet conduit 22 is limited by the smaller diameter of the hole 66). Further, an end of the outlet conduit 22 includes a circumferential groove 22A. The distance of the circumferential groove 22A from the end of the outlet conduit 22 generally corresponds to the distance between the outer surface of the cover 14 and the holes 70. Further, the width of the circumferential groove 22A (as measured along a longitudinal axis of the outlet conduit 22) generally corresponds to the width of the holes 70. Therefore, the retainer clip 24 and the outlet conduit 22 are cooperatively configured such that when the outlet conduit 22 is received within the central hole 69 of the clip receiving structure 68, the legs 24A of the retainer clip 24 may be received within the holes 70 to engage the circumferential groove 22A, in order to retain the outlet conduit 22 within the clip receiving structure 68.

Although the FIGURES disclose an outlet conduit 22 having certain features (including, e.g., a particular length and shape), it should be understood that other outlet conduits having other features may be configured to couple to the clip receiving structure 68. For example, a shorter or longer outlet conduit may be coupled to the clip receiving structure 68. Also, a curved outlet conduit may be coupled to the clip receiving structure 68.

According to an exemplary embodiment, the outlet conduit 22 is formed of a polymeric material (e.g., cross-linked polyethylene, polypropylene, etc.). According to an exemplary embodiment, the outlet conduit 22 is configured to be generally rigid (e.g., stiff). Alternatively, the outlet conduit 22 is configured to be generally flexible.

According to an exemplary embodiment, a watertight seal is provided between the outlet conduit 22, the clip receiving structure 68, and/or the cover 14 when the outlet conduit 22 is coupled thereto. For example, the outlet conduit 22 may include an additional circumferential groove (not shown, but in addition to the circumferential groove 22A) configured to receive a sealing member (e.g., an o-ring, seal, etc.). Such a sealing member may provide a watertight seal between an outer radial surface of the outlet conduit 22 and an inner surface of the clip receiving structure 68. According to an exemplary embodiment, a suitable sealing member may be received within the central hole 69, and an end of the outlet conduit 22 may engage the sealing member, thus creating a watertight seal between the cover 14 and the outlet conduit 22. Alternatively, a watertight seal may be provided between the cover 14, the outlet conduit 22, and/or the clip receiving structure 68 by using a silicone sealant (e.g., RTV) or similar sealant. It should be understood that a watertight seal may be provided between the outlet conduit 22 and the cover 14 using other seal members or sealants, and that the methods disclosed herein are not intended to be limiting.

According to an exemplary embodiment shown in FIGS. 5 and 8, when the water lines 16, the cover 14, and the valve cartridge 26 are coupled to the valve housing 12, and the outlet conduit 22 is coupled to the cover 14, the outlet conduit 22 may be in fluid communication with the water lines 16. For example, the valve cartridge 26 may be adjusted to allow water supplied by the water lines 16 to flow past a rotatable ceramic disk and into the outlet hole 58 of the valve housing 12. A watertight seal is provided between the inner surface of the cover 14 and the valve housing 12 by the sealing sections 60A, 60B. Water supplied to the outlet hole 58 may exit through the hole 66 provided within the radial surface of the cover 14. Water supplied to the hole 66 of the cylinder may be in fluid communication with the outlet conduit 22.

Referring to FIG. 6A, according to an exemplary embodiment, each end of the cover 14 (i.e., a top and bottom end) includes a plurality of castellations 72 (e.g., a series of notches that are radially disposed on each end of the cover 14). As shown in FIG. 6A, each end of the cover 14 includes four castellations 72. According to other exemplary embodiments, each end of the cover 14 may have a fewer or greater number of castellations. Referring now to FIG. 4, a top surface of the base 30A of the valve housing 12 includes a pair of ribs 74. The two ribs 74 are spaced apart radially along the base 30A. In particular, as shown in FIG. 2, the distance that separates the ribs 74 generally corresponds to the distance that separates consecutive castellations 72. According to other exemplary embodiments, the upper portion 30 may include a fewer or greater number of ribs, and the ribs may be spaced apart by any suitable distance.

According to an exemplary embodiment, the cover 14 may be coupled to the upper portion 30 of the valve housing 12 in a plurality of different orientations. According to various exemplary embodiments, the cover 14 may be coupled to the upper portion 30 in at least eight different orientations. For example, as shown in FIG. 6A, the cover 14 may be rotated about a vertical axis relative to the valve housing 12 (e.g., a full 360 degrees in 90 degree increments), as generally indicated by the arrow in FIG. 6A, to thereby change the angular position of the outlet conduit 22 relative to the valve housing 12 (shown in FIG. 4). Additionally or alternatively, the cover 14 may be flipped end-to-end relative to the valve housing 12, as generally indicated by the arrow in FIG. 6B, to thereby change the vertical position of the outlet conduit 22 relative to the valve housing 12. In this manner, the cover 14 and the valve housing 12 can accommodate a variety of different faucet configurations, such as faucet bases 100A and 100B shown in FIGS. 1A-1B, to thereby simplify the assembly process and reduce manufacturing costs.

Figure 7:
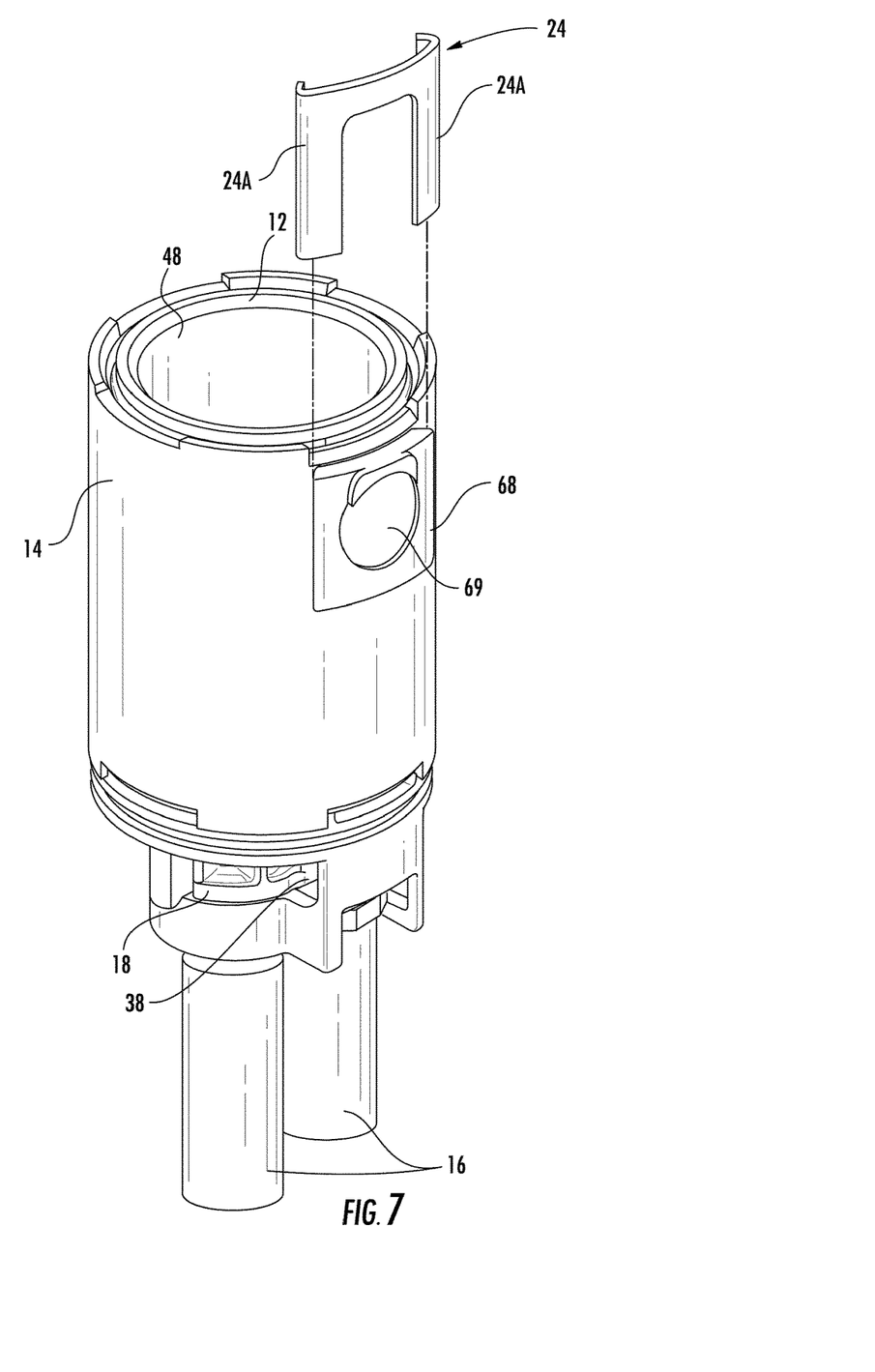
FIG. 7 is a perspective view of a valve housing assembly, according to another exemplary embodiment.

Referring to FIGS. 7-8, another exemplary embodiment for a cover 14, clip receiving structure 68, retainer clip 24, and outlet conduit 22 are shown. The clip receiving structure 68 shown in FIGS. 7-8 includes a left and right side which tapers inwardly from an outer surface to an inner surface proximate the cover 14. The retainer clip 24 is generally U-shaped, and an open section of the U-shaped retainer clip 24 is configured to receive the outlet conduit 22. That is, the distance between the open section of the retainer clip 24 is slightly larger than an outer diameter of the outlet conduit 22. The two "legs" 24A of the U-shaped retainer clip 24 are configured to secure the retainer clip 24 to the clip receiving structure 68. For example, an outer portion of each leg 24A is bent rearwardly past ninety degrees. In particular, the rearwardly bent portions of the legs 24A are configured to engage the inwardly tapered sides of the clip receiving structure 68. Thus, the legs 24A restrain the retainer clip 24 in a radial direction relative to the cylinder 14. Further, inner portions of each leg 24A are configured to engage a circumferential projection (e.g., protrusion, member, etc.) of the outlet conduit 22. Accordingly, as shown in FIG. 8, when an end of the outlet conduit 22 is received by a central hole 69 of the clip receiving structure 68, and the retainer clip 24 is coupled to the clip receiving structure 68, the retainer clip 24 secures (e.g., holds, retains, etc.) the outlet conduit 22 within the clip receiving structure 68.

According to another exemplary embodiment, the ends of the cover 14 do not include castellations, and the top surface of the base 30A of the upper portion 30 does not include a pair of ribs. Alternatively, according to another exemplary embodiment, the cover 14 includes a series of castellations 72, but the upper portion 30 does not include a pair of ribs. According to these exemplary embodiments, the cover 14 may be coupled to the upper portion 30 in an infinite number of ways by rotating the cylinder relative to the upper portion 30.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the valve housing assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A valve housing assembly, comprising:
a valve housing including an upper portion configured to couple to a valve cartridge and a lower portion configured to couple to one or more water supply lines; and
a hollow cover configured to be coupled to the valve housing in a plurality of different orientations, wherein the hollow cover substantially surrounds, and sealingly engages, the valve housing;
wherein the valve housing assembly including the valve housing and the hollow cover is configured to be coupled to, and received entirely within, a plurality of different faucet bodies having different configurations.

2. The valve housing assembly of claim 1, wherein the cover is configured to be coupled to the valve housing in at least two different orientations by flipping the cover end-to-end relative to the valve housing.

3. The valve housing assembly of claim 1, wherein the cover is configured to be coupled to the valve housing in at least four different angular positions by rotating the cover about a vertical axis relative to the valve housing.

4. The valve housing assembly of claim 1, wherein the valve housing includes a base disposed at the lower portion, wherein the base includes a sealing portion configured to sealingly engage a faucet base.

5. The valve housing assembly of claim 1, wherein the cover includes a hole disposed in a radial surface thereof, and the valve housing assembly further comprises an outlet conduit removably coupled to the cover at the hole, wherein the outlet conduit is configured to direct fluid from the valve housing through the hole to an outlet of a faucet spout.

6. The valve housing assembly of claim 5, wherein the cover includes a first end and an opposite second end, and the hole of the cover is positioned closer to the first end than the second end.

7. The valve housing assembly of claim 6, wherein the valve housing includes an outlet hole configured to be in fluid communication with the hole of the cover to direct fluid from the one or more water supply lines to the outlet conduit.

8. The valve housing assembly of claim 7, wherein the valve housing includes a first sealing section disposed at the upper portion and a second sealing section disposed at the lower portion, and wherein the cover is configured to engage the first and second sealing sections to create a watertight seal therebetween.

9. The valve housing assembly of claim 8, wherein the cover and the valve housing define a space therebetween that extends between the first sealing section and the second sealing section so as to permit a flow of fluid from the outlet hole of the valve housing to the hole of the cover.

10. The valve housing assembly of claim 9, further comprising a retainer configured to removably couple one or more water supply lines to the valve housing;
wherein the retainer includes a biasing member configured to bias the retainer against the one or more water supply lines within each port so as to retain the one or more water supply lines in the valve housing.

11. The valve housing assembly of claim 1, wherein the valve housing includes one or more ports located at the lower portion, and each port is configured to receive an end of a water supply line therein.

12. A valve housing assembly, comprising:
a valve housing including an upper portion configured to couple to a valve cartridge and a lower portion configured to couple to one or more water supply lines;
a cover configured to be coupled to, and substantially surround at least a portion of, the valve housing, wherein the cover comprises:
a first end;
a second end located opposite the first end; and
a hole disposed in a radial surface of the cover and positioned closer to the first end than the second end; and
an outlet conduit removably coupled to the cover at the hole, wherein the outlet conduit is configured to direct fluid from the valve housing to an outlet of a faucet spout;
wherein the cover is configured to be coupled to the valve housing in a plurality of different orientations such that the valve housing assembly including the valve housing and the cover may be coupled to, and received entirely within, a plurality of faucet bodies having different spout configurations.

13. The valve housing assembly of claim 12, wherein the cover is configured to be coupled to the valve housing in at least two different orientations by flipping the cover end-to-end relative to the valve housing.

14. The valve housing assembly of claim 12, wherein the cover is configured to be coupled to the valve housing in at least four different angular positions by rotating the cover about a vertical axis relative to the valve housing.

15. The valve housing assembly of claim 12, wherein the valve housing includes a base disposed at the lower portion, wherein the base includes a sealing portion configured to sealingly engage a faucet base.

16. The valve housing assembly of claim 15, wherein the valve housing includes an outlet hole configured to be in fluid communication with the hole of the cover to direct fluid from the one or more water supply lines to the outlet conduit.

17. The valve housing assembly of claim 16, wherein the valve housing includes a first sealing section disposed at the upper portion and a second sealing section disposed at the lower portion above the base, wherein the cover is configured to sealingly engage the first and second sealing sections to create a watertight seal therebetween, and wherein the cover and the valve housing define a space therebetween that extends between the first sealing section and the second sealing section so as to permit a flow of fluid from the outlet hole of the valve housing to the outlet conduit.

18. The valve housing assembly of claim 12, wherein the valve housing includes one or more ports located at the lower portion, and each port is configured to receive an end of a water supply line therein.

19. The valve housing assembly of claim 18, further comprising a retainer configured to removably couple the one or more water supply lines to the valve housing;
wherein the retainer includes a biasing member configured to bias the retainer against the one or more water supply lines within each port so as to retain the one or more water supply lines in the valve housing.

20. A faucet having a valve housing assembly, comprising:
a valve housing including an upper portion configured to couple to a valve cartridge and a lower portion configured to couple to one or more water supply lines; and
a cover configured to be coupled to the valve housing in a plurality of different orientations such that the valve housing assembly including the valve housing and the cover may be coupled to, and received entirely within, a plurality of different faucet bodies having different configurations;

wherein the cover substantially surrounds at least a portion of the valve housing.

* * * * *